Dec. 1, 1970    R. W. RALPHS    3,544,910
ANALOG TO DIGITAL METHOD AND APPARATUS FOR MONITORING
THE STATUS OF A PARAMETER
Filed May 7, 1968    3 Sheets-Sheet 1
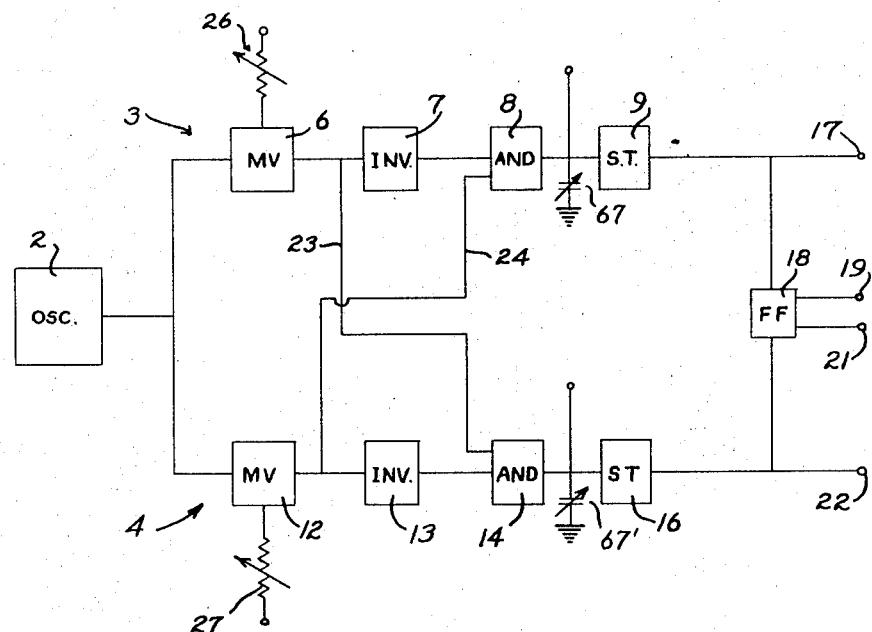
Fig_1
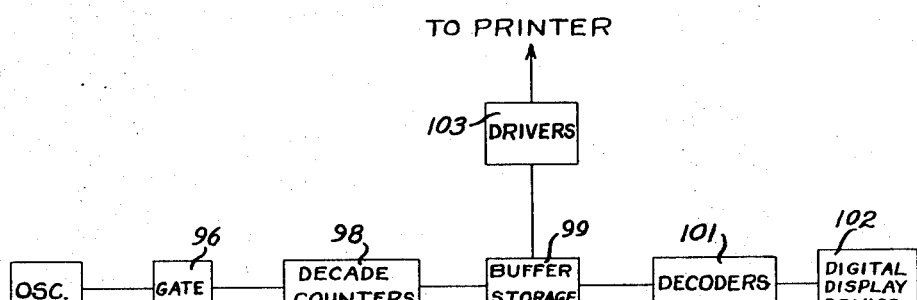
Fig_5
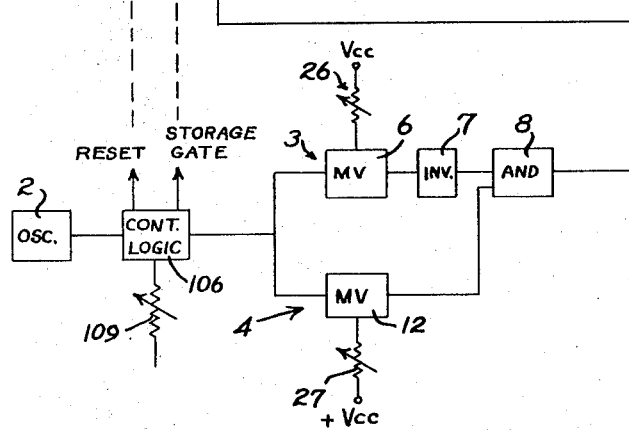
INVENTOR.
RUSSELL W. RALPHS
BY
John J. Leavitt

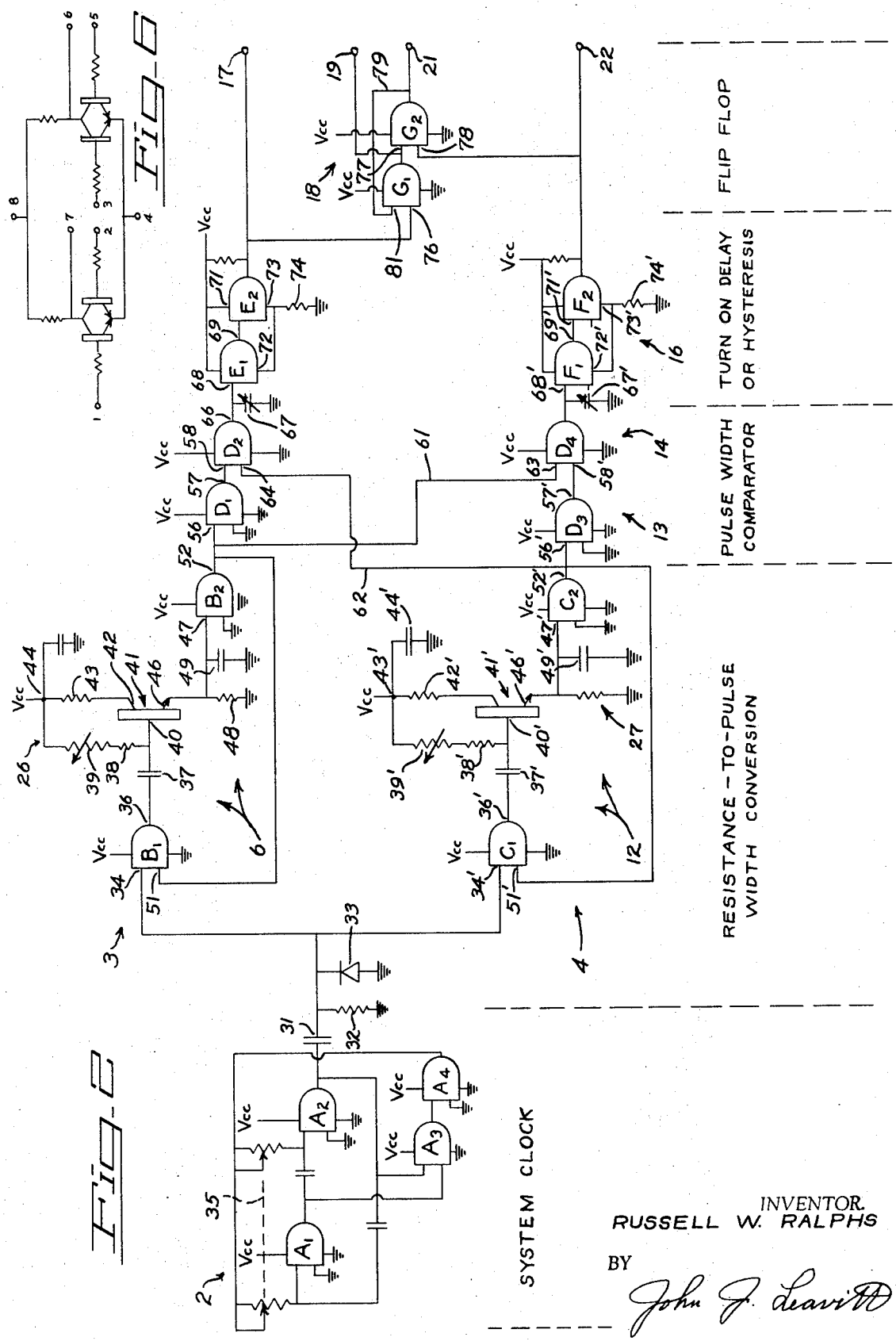

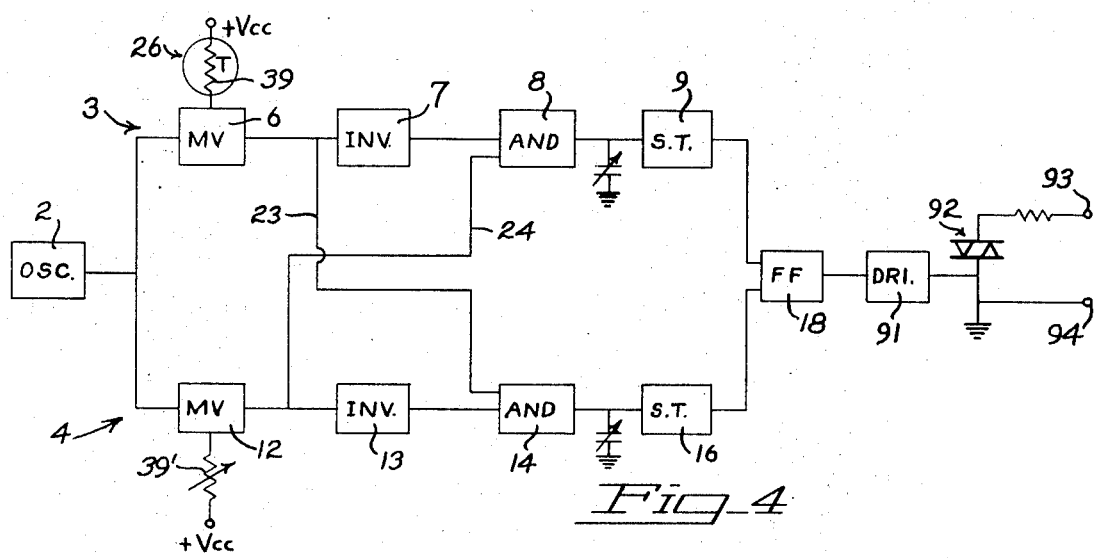
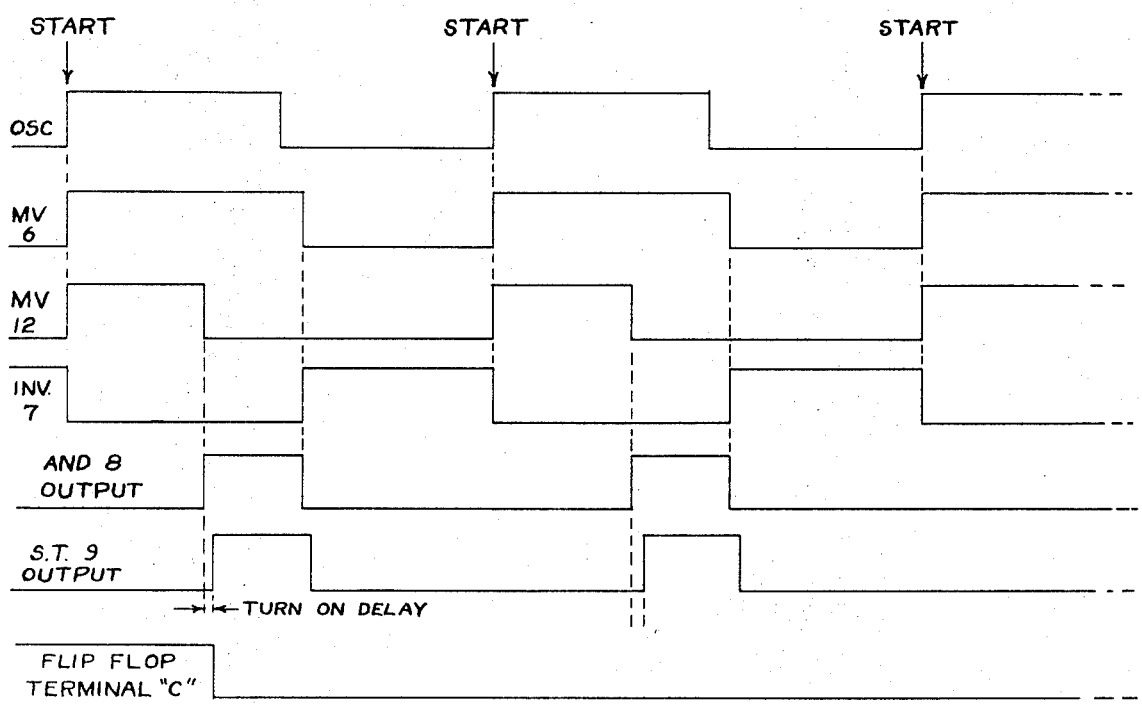

United States Patent Office 3,544,910
Patented Dec. 1, 1970

3,544,910
ANALOG TO DIGITAL METHOD AND APPARATUS FOR MONITORING THE STATUS OF A PARAMETER
Russell W. Ralphs, Concord, Calif., assignor to James D. Lambert, Mountain View, Calif.
Filed May 7, 1968, Ser. No. 727,147
Int. Cl. H03k 17/00
U.S. Cl. 328—150      21 Claims

ABSTRACT OF THE DISCLOSURE

Presented is a method and apparatus for monitoring the status of a parameter which may vary continuously or noncontinuously from a predetermined norm. The variations in the status or condition of the parameter are analog in nature, and such variations are utilized to produce a digital or analog pulse width output correlated to the analog variation. An oscillator or other source having a pulsed wave output is selectively adjustable over a broad repetition rate range and channels a pulsed wave into a utilization circuit having first and second branch circuits. Multivibrators are serially interposed in the branch circuits, and in at least one embodiment, one of the branch circuits is also provided with an inverter and a logical AND circuit which cooperate to provide a pulse width comparator means which functions to compare the pulse widths that are imposed on the two multivibrators. Circuit means are provided cross-connecting the separate branches of the utilization circuit so as to impose on the logical AND circuit of one branch signal pulses from the other branch prior to inverter action. In this way the output from the logical AND circuit constitutes a pulse having a width which equals the difference in pulse width between the pulses emanating from the multivibrators. Means are provided to correlate the pulse width emanating from a first one of the multivibrators to variations in the condition being monitored. Means are also provided associated with the other multivibrator establishing the pulse width emanating from this multivibrator as a reference against which the pulses from the first multivibrator are compared for width. Means in the form of a delay circuit, or digital dissemination equipment, or transistor operated load means of various kinds, are provided to receive the digital or analog pulse width output signal emanating from the pulse width comparator means to effect a digital display or readout of information pertaining to the condition being monitored.

BACKGROUND OF THE INVENTION

There is a need in today's technology for devices that will monitor conditions required to conform to a predetermined norm or standard and which may be implemented to display or otherwise indicate variations of the condition monitored from such predetermined norm so that remedial action may be taken to correct the condition creating the variation. The need for such devices has been recognized and at least to some extent devices have been developed which perform this monitoring function. In general, however, such devices have been unduly complex and have utilized the concept of signal conversion to yield output pulses which possess a polarity and time-width corresponding to the amplitude of an input pulse, in relation to the amplitude of a reference pulse. Such a device is disclosed in United States Pat. No. 3,274,514. It has been found that such devices which depend for their operation on the comparison of two different amplitudes lack the accuracy and reliability of a device that is not so restricted. Accordingly, it is one of the important objects of the present invention to provide a method and device for monitoring the status or condition of a parameter and which does not depend for accuracy and reliability upon a comparison of the amplitude of signals from two different sources.

The method and circuit devised to practice the method, possess a general utility enabling use to monitor a parameter with respect to pressure, including fluids, gases, static and dynamic. The invention is applicable also for installation in remote areas where accuracy and reliability are important factors because of the inaccessibility of the equipment for maintenance. In another environment, the method and circuit may be aplied to test the salinity of water and to reflect variations in such salinity from a permissible value. Or, the invention may be utilized in avionics to continuously monitor and display the altitude of an aircraft above a reference plane such as sea level, or display directly the altitude of the aircraft above the ground, giving effect to all the variations of altitude along the flight path. Other applications include temperature and weight measurements, and liquid level and flow rate meters. In short, by proper selection of the sensing device appropriate to the condition being sensed, the method and circuit utilized to practice the method may be applied in many different ways.

One of the disadvantages of conventional monitoring devices has been their cost, with the cost of the devices being related to their complexity. Additionally, such complex conventional monitoring devices have in general been large in size and inapplicable in environments where reduction of size and weight are important factors. Accordingly, it is a still further object of the invention to provide a device incorporating solid-state electronic components arranged to provide accuracy and reliability over a wide range of parameter values and condition variations, and which can be sold to ultimate consumers at a relatively low cost compared with conventional monitoring devices.

Versatility is an important characteristic in a condition monitoring device. Such versatility should include the capability of utilization of the device to detect variations in an output voltage or to detect variations in resistance of a circuit, and the capability to convert such variations into digital or analog pulse width outputs correlated to the variation. Accordingly, it is one of the objects of the present invention to provide a method and circuit capable of being activated by continuous of noncontinuous analog variations in the condition or status being monitored to produce a digital or analog pulse width output correlated to the variation.

As indicated above, condition monitoring devices such as the one disclosed in United States Pat. No. 3,274,514 utilize a comparison of amplitudes to signal a variation in a conditoin being monitored. It is one of the objects of this invention to utilize a pulse width that is not dependent upon amplitude, in relation to a second pulse width which forms a reference against which the first pulse may be compared, to generate and transmit a pulse that constitutes the difference in width of the two pulses, this difference in pulse width being channeled into a utilization circuit to indicate or control variations in the condition being monitored.

The invention possesses other objects and features of advantage, some of which, with the foregoing, will become apparent from the following description and the drawings. It is to be understood however that the invention is not limited to the method or means illustrated and described, but may be variously embodiment within the scope of the appended claims.

SUMMARY OF INVENTION

In terms of broad inclusion, the invention comprises a method and circuit for monitoring the status or condition of a parameter, the circuit being activated by continuous or noncontinuous variations in such status from a predetermined norm to produce a digital or analog pulse width output correlated to such variations. The continuous or noncontinuous variations in the condition or status being monitored may result from the application of any kind of transducer or other sensing device that is appropriate to the condition being sensed. Thus, to effect measurement of variations in temperature, a temperature-sensitive transducer may be utilized. On the other hand, where the absence or presence of light is the condition being monitored, suitable light-sensitive transducers or sensors may be utilized. The circuit provides a "system clock" which may be an oscillator having a variable and selectively adjustable repetition rate appropriate to the application, with the output from the oscillator being a pulsed wave divided and channeled into two separate branch circuits, each of which includes a monostable multivibrator associated with appropriate controls to control the width of the output from such multivibrator. One of the multivibrators is operatively associated with means for sensing a variation from a predetermined standard in a condition being monitored, and is arranged to produce an output pulse having a width that is proportional to the degree of variation of the condition from the predetermined normal or standard condition. The other multivibrator is arranged with a suitable selectively adjustable control so that the pulse which emanates from this multivibrator is controlled in width in relation to the predetermined standard and provides a reference pulse width against which the pulse width from the first multivibrator may be compared. The two separate pulses are channeled into inverters serially interposed in each of the branch circuits, with each of the inverters being associated with logical AND circuits in a way to control the activation of one or the other of the branch circuits, depending upon whether the reference pulse width is longer or shorter than the pulse width directly correlated to the variation sensed. The output from the pulse width comparator portion of the activated branch circuit is imposed, in one embodiment, upon a suitable delay circuit which is effective to control the turn-on delay or hysteresis of the circuit. In another embodiment, the output from the activated branch circuit may be imposed upon digital dissemination equipment of a variety of types, the digital equipment being effective to either display, readout, or otherwise indicate or control variations in the condition of the parameter being monitored.

BRIEF DESCRIPTION OF DRAWINGS

FIG. 1 is a schematic illustration in block diagram form illustrating the various parts of one embodiment of the circuit.

FIG. 2 is a circuit diagram illustrating the interconnection of the various components represented in block diagram form in FIG. 1.

FIG. 3 is a timing diagram illustrating the relationship of output pulses from the various components illustrated in FIG. 2, with each output pulse identified by legend at the left of the figure.

FIG. 4 is a schematic illustration in block diagram form of a different embodiment of the circuit illustrated in FIG. 1.

FIG. 5 is a schematic illustration in block diagram form of a third embodiment of the basic circuit illustrated in FIG. 1 shown connected to digital dissemination equipment.

FIG. 6 is a schematic illustration of a dual two-input gate circuit shown only symbolically in FIG. 2.

DESCRIPTION OF PREFERRED EMBODIMENT

In terms of greater detail, the method and apparatus of the invention for monitoring variations in the status of a parameter comprises an oscillator 2, preferably adjustable to a selected repetition rate correlated to the particular condition being monitored. The output from the oscillator is channeled into a pair of branch circuits designated generally by the numerals 3 and 4. Referring to the block diagram illustrated in FIG. 1, branch circuit 3 includes a multivibrator 6, an inverter 7, a logical AND circuit 8, and a filter and Schmitt trigger constituting a delay circuit 9.

In branch circuit 4, corresponding components are designated by numerals 12, 13, 14 and 16. The output from the delay circuit 9 is connected to an output terminal 17, and is also connected to a solid-state flip-flop circuit 18 provided with terminals 19 and 21. The output of delay circuit 16 is similarly connected to a terminal 22 and to flip-flop circuit 18. As shown in the drawings, the branch circuits are cooperatively interconnected by cross-connecting circuits 23 and 24, the circuits cross-connecting in a manner which will be hereinafter explained in greater detail.

In general, and referring to FIGS. 1 and 3, output pulses having a predetermined repetition rate are imposed by the oscillator 2 upon both multivibrators 6 and 12. The output from the oscillator is preferably a pulsed output, with the leading edge of each pulse triggering both multivibrators simultaneously, so that each of these components in turn generates a pulse at its respective output terminal. With respect to multivibrator 6, the width of the pulse is determined by means designated generally by the numeral 26, and effective to detect a variation in a condition being monitored and to vary the width of the pulse emanating from the multivibrator 6 in proportion to the degree of variation of the condition from a predetermined normal condition or standard.

The multivibrator 12 on the other hand is provided with a control means designated generally by the numeral 27, selectively adjustable to control the width of pulse generated by this multivibrator to provide a reference pulse width against which the pulse width emanating from multivibrator 6 may be compared. The setting selected for the pulse width emanating from multivibrator 12 is determined by the normal or standard characteristic or value desired for the parameter being monitored.

The output pulse from multivibrator 6, which in an environment in which the condition being monitored varies continuously over a predetermined range will itself vary continuously in width, is applied to an input terminal of inverter 7, and is also applied through cross-connecting circuit 23 to an input terminal of logical AND circuit 14. On the other hand, the reference pulse emanating from multivibrator 12 possesses a predetermined width selected by adjustment of variable resistor means 27, and such reference pulse is applied to an input terminal of inverter 13 and, through cross-connecting circuit 24, is also applied to an input terminal of logical AND circuit 8.

The relative pulse widths constituting the outputs from oscillator 2, multivibrators 6 and 12 and inverter 7 are shown in the timing diagram illustrated in FIG. 3. As there shown, the output pulse from multivibrator 6 is relatively wider than the output pulse from oscillator 2. On the other hand, the output pulse from multivibrator 12 is of less width than the pulse width emanating from the multivibrator 6. It will of course be apparent that other pulse width relationships may be selected.

Inasmuch as the pulse from branch circuit 3, taken as it is prior to inverter action, is imposed upon the input terminal of the logical AND circuit 14, and inasmuch as the output from the inverter 13 imposes upon one of the input terminals of the logical AND circuit 14 a pulse width equal to the reference pulse width but inverted in polarity, it will be seen that the logical AND circuits 8 and 14 make the determination that the pulse width emanating from multivibrator 6 is wider than the pulse output emanating from multivibrator 12.

As indicated in FIG. 3, the logical AND circuit 8 compares the widths of the pulse output emanating from multivibrator 6 and inverted by inverter 7 with the pulse width emanating from multivibrator 13 prior to inverter action. The logical AND circuit 8 thus compares a relatively wide pulse having a negative polarity with a relatively narrower pulse having a positive polarity. This comparison of the pulse widths emanating from multivibrators 6 and 12 results in the logical AND circuit producing an output in pulse form, the output pulse width being equal to the difference in widths of the two pulses compared by the pulse width comparator means made up of inverter 7 and logical AND circuit 8 on the one hand, and made up of inverter 13 and logical AND circuit 14 on the other hand.

The pulsed output emanating from logical AND circuit 8 and constituting the difference in pulse widths from multivibrators 6 and 12, is imposed upon a delay circuit 9 including a Schmitt trigger which is effective to control the turn-on delay or hysteresis of the circuit. The pulsed output from branch circuit 3 is applied to the flip-flop 18 and to terminal 17.

In the instance where the reference pulse emanating from multivibrator 12 is wider in point of time than the pulse width emanating from multivibrator 6, the logical AND circuit 14, cooperating with the logical AND circuit 8 and the respective inverters 7 and 13, operates to activate the branch circuit 4 rather than the branch circuit 3. It will thus be seen that a method and circuit have been devised which utilize the width of a pulse as distinguished from its amplitude to initiate a control or indication of the variation of a parameter being monitored.

Referring specifically to FIG. 2, it is there shown that the oscillator 2 illustrated in block diagram form in FIG. 1, comprises a plurality of fully integrated monolithic circuits contained in a single package, with the individual integrated circuits contained in the oscillator 2 being identified by the general designatitons A1, A2, A3 and A4. In the interest of brevity, it may be stated that this oscillator assembly may include a conventional integrated circuit package such as one manufactured by Motorola and sold under the trade designatiton MC724P. The oscillator of course includes other conventional components as shown connected to provide an adjustable repetition rate. Each of the integrated circuits contained in the package is energized from a suitable supply voltage, and is connected through a capacitor 31 to branch circuits 3 and 4 as previously described. Capacitor 31 and resistance 32 form a differentiating circuit to clip off the pulses so as to define each pulse as a fast-rising spike of short duration. Adjustment of the repetition rate of such spikes is effected through manipulation of a suitable and adjustable ganged variable resistor 35, while diode 33 is provided to clip off the negative portion of each spike.

With respect to branch circuit 3, and referring specifically to FIG. 2, multivibrator 6 also constitutes a fully integrated monolithic circuit including the integrated circuits B1 and B2 which may be commercially available dual two-input circuits sold under the trade name uL914 by Fairchild Camera and Semiconductor Company. The internal interconnections of the transistors forming the monolithic circuit is illustrated schematically in FIG. 6. It will of course be understood that each of these integrated circuits is provided with a suitable supply voltage, the terminals for such supply voltage being indicated as $V_{cc}$ on each integrated circuit symbol.

Referring specifically to the monolithic circuit B1–B2 in FIG. 2, the integrated circuit B1 is provided with an input terminal 34, connected to the output of the oscillator 2. As indicated, the output terminal 36 of integrated circuit B1 is connected to one electrode of a capacitor 37, the other electrode of the capacitor being connected to the supply voltage through a fixed resistor 38 and a variable resistor 39 which can take the form of a transducer havig a variable resistance element associated therewith. The capacitor 37 is also connected to the base terminal 40 of transistor 41, the collector terminal 42 of which is connected through an appropriate resistor 43 to the supply voltage terminal 44.

The emitter 46 of transistor 41 is connected to input terminal 47 of the integrated circuit B2, as shown, with the interconnection being provided with a resistance 48 and a capacitor 49 as shown, for the purpose of providing stability in the circiut and preventing false triggering. As previously indicated, the integrated circuits B1 and B2 constitute a fully integrated monolithic circuit, preferably fabricated in a single package, with the other circuit components being appendages suitably connected to the exterior terminals of the integrated package. As shown in the drawing, the second input terminal 51 to integrated circuit B1 is connected to the output terminal 52 of integrated circuit B2 to provide a measure of feedback between these two integrated circuits for the purpose of faster switching from turn-on to turn-off and vice versa.

With specific reference to FIG. 2, and particularly to multivibrator 12 serially interposed in branch circuit 4, the components of this multivibrator are essentially the same as the components of the multivibrator discussed in the previous paragraphs. In the interest of brevity of description, the integrated circuits in this multivibrator are designated C1 and C2, with the other components forming appendages thereto carrying reference numbers corresponding to like components in multivibrator 6 but with primes attached. It should be noted however that the variable resistor 39' illustrated with respect to multivibrator 12, constitutes a selectively adjustable component that may be set to control the width of pulses emanating from multivibrator 12.

In other words, whereas the component 39 in multivibrator 6 varies continuously or noncontinuously depending upon the condition of the parameter being sensed, the component 39' with respect to multivibrator 12 is adjusted in correlation to the predetermined norm that has been assigned or selected for the parameter being monitored. Thus, with such predetermined norm or standard being represented by a predetermined width of pulse emanating from multivibrator 12, any pulse that emanates from multivibrator 6 will be of less width, of greater width, or of equal width with the pulse emanating from multivibrator 12 and constituting the basis for comparison. It should be noted that with respect to both multivibrators, pulses applied to the input terminals of these multivibrators effect triggering of the multivibrators at the same instant, with the width of the pulse emanating from the multivibrators being determined by the variable components 39 and 39'.

Referring to branch circuit 3, the output 52 from integrated circuit B2 is connected to the input terminal 56 of integrated circuit D1. In like manner, referring to branch circuit 4, the output terminal 52' of integrated circuit C2 is connected to the input terminal 56' of integrated circuit D3. As indicated in the timing diagram illustrated in FIG. 3, the integrated circuits D1 and D3 function as inverters to invert the polarity of the pulses applied to input terminals 56 and 56' thereof. Thus, since the output pulses from multivibrators 6 and 12 are positive polarity pulses, the pulses emanating from output terminals 57 and 57' of integrated circuits D1 and D3 are inverted to a negative polarity and are imposed upon input terminals 58 and 58' of integrated circuits D2 and D4, respectively. These latter integrated circuits D2 and D4 constitute logical AND circuits 8 and 14, respectively, that form a gate to determine whether or not the pulses imposed thereon will be transmitted into the output section of the respective branch circuits.

As discussed briefly above, the determination of whether or not the output pulses from the inverters in each of the branch circuits are transmitted into the output section of the associated branch circuit is dependent upon the widths of the pulses emanating from the multivibrators. Thus, if multivibrator 6 produces an output pulse that is wider than the output pulse set as the standard from multivibrator 12, the logical AND circuit 8 will cooperate with logical AND circuit 14 to energize the output section of branch circuit 3. On the other hand, if the standard pulse width emanating from multivibrator 12 is wider than the pulse width emanating from multivibrator 6, which is indicated above, may vary in accordance with the condition of the parameter being mentioned, then logical AND circuits 8 and 14 cooperate to energize the output section of branch circuit 4.

To produce such gating action between the logical AND circuits 8 and 14, cross-connecting circuits 61 and 62 are provided. Cross-connecting circuit 61 connects the output terminal 52 of integrated circuit B2 with the input terminal 63 of integrated circuit D4. The effect of such interconnection is to impose the position pre-inverter action pulse emanating from the integrated circuit B2 upon input terminal 63 of the integrated circuit D4, the other input terminal 58′ of which is connected to the output terminal 57′ of integrated circuit D3, from which a negative polarity pulse having a pulse width equal to the pulse width emanating from multivibrator 12 is imposed upon the second input terminal 58′ of integrated circuit D4.

In like manner, the cross-connecting circuit 62 interconnects the output terminal 52′ of integrated circuit C2 with the second input terminal 64 of integrated circuit D2, which forms the logical AND circuit 8, thus imposing upon said second input terminal 64 a positive pulse having a width equal to the reference pulse width emanating from the output of integrated circuit C2. Thus, with specific reference to the logical AND circuit 8, the negative polarity pulse imposed on input terminal 58 is compared with the positive polarity pulse imposed on input terminal 64, which latter pulse constitutes the standard or reference pulse width. Logical AND circuit 8 compares the widths of these two opposite polarity pulses, as illustrated graphically in the timing diagram of FIG. 3, with the result that the output from the output terminal 66 of logical AND circuit 8 constitutes a pulse having a width equal to the difference in pulse widths of the opposite polarity pulses imposed on input terminals 58 and 64 of integrated circuit D2. In like manner, the logical AND circuit 14 compares the opposite polarity pulses imposed on input terminals 58′ and 63, and, in the event that the standard pulse width emanating from multivibrator 12 is wider than the pulse width imposed on input terminal 63, produces an output from its terminal 66′ that constitutes the difference in widths of the two opposite polarity pulses imposed.

It will thus be seen that with respect to the multivibrator sections of the utilization circuit formed by branch circuits 3 and 4, the combination of multivibrators may be designated as a resistance-to-pulse width conversion means, while the interconnection of inverters 7–13 and logical AND circuits 8–14 may be designated as a pulse width comparator means.

Assuming that the pulse emanating from multivibrator 6 is of greater width than the standard pulse width emanating from multivibrator 12, the branch circuit 3 will be energized as previously discussed. An output pulse having a width equal to the difference in width of the two pulses compared will be transmitted from output terminal 66 of logical AND circuit 8, and will be imposed upon the delay circuit designated generally by the numeral 9, and including an adjustable capacitor 67 which may be adjusted to control the duration of the turn-on delay.

The delay circuit also includes a Schmitt trigger made up of a monolithic circuit including integrated circuits E1 and E2, the input terminal 68 of integrated circuit E1 being connected to the output terminal 66 of the integrated circuit D2. The output terminal 69 of integrated circuit E1 is connected to the input terminal 71 of integrated circuit E2 as shown, with the emitter terminals 72 and 73 of integrated circuits E1 and E2, respectively, being connected to resistor 74 as shown. The output from the delay circuit is applied to terminal 17 and to flip-flop circuit 18 as previously discussed. It will of course be noted that branch circuit 4 includes a delay circuit 16 constituted by corresponding components in which the integrated circuits are designated F1 and F2, and the other components are correspondingly numbered with the addition of primes.

As shown best in FIG. 2, the flip-flop circuit 18 is fabricated as a monolithic circuit utilizing integrated circuits G1 and G2 connected so that the output pulse from the delay circuit 9 is imposed upon one of the input terminals 76 of the integrated circuit G1. The output from this integrated circuit G1 is applied to one of the input terminals 77 of integrated circuit G2, with the other input terminal 78 of the integrated circuit G2 being connected to the output terminal of the delay circuit 16 included in branch circuit 4. As indicated in the drawing, the output from integrated circuit G1 is also connected to terminal 19, while the output from integrated circuit G2 is connected directly to terminal 21, and is also connected in a feedback circuit 79 to the input terminal 81 of integrated circuit G1. The internal connections of the integrated circuits G1 and G2 are represented schematically in FIG. 6.

In the instance where the reference pulse width emanating from multivibrator 12 is wider than the pulse width emanating from multivibrator 6, the branch circuit 4 will be energized by a succession of pulses each of which has a width that constitutes the difference in width between the reference pulse width and the pulse width emanating from multivibrator 12. These pulses are applied to the delay circuit 16 in branch circuit 4, with the delayed pulse emanating from the delay circuit being imposed upon terminal 22 and the input terminal 78 of integrated circuit G1.

In the embodiment of the invention illustrated in FIG. 4, the basic circuit illustrated in FIG. 2 has been modified to the extent of making it specifically applicable to monitor temperature and provide an indication of variations thereof together with control thereover. In this embodiment, the sensing element or transducer 26 constitutes a thermistor sensitive to thermal variations to effect an increase or decrease in resistance in resistor 39. Variation of this resistance modifies the operation of the associated multivibrator to either increase or decrease the width of the pulses emanating therefrom as previously discussed. The reference pulse width adjustment 39′ in FIG. 4 operates similarly to the corresponding component in FIG. 2. One of the primary differences in the circuit illustrated in FIG. 4 from the circuit illustrated in FIG. 2 is that the output from the flip-flop in FIG. 4 is imposed upon a driver 91 which may be an appropriate transistor, the output from which is imposed upon the bi-directional triode thyristor 92 connected between load terminals 93 and 94.

In the embodiment of the invention illustrated in FIG. 5, the basic circuit illustrated in FIG. 2 has been modified in branch circuit 4 by eliminating inverter 13 and the components that follow the inverter. Additionally, the cross-connecting circuit 23 has been eliminated. Also, with respect to branch circuit 3, the delay circuit 9 has been eliminated and the output from logical AND circuit 8 is applied directly to the gate 96 of a digital dissemination circuit driven by an oscillator 97. The digital dissemination circuit includes decade counters 98, buffer storage 99, decoders 101, and a Digital Readout 102 as shown. To effect a readout, appropriate drivers 103 are connected to the buffer storage 99, the drivers being appropriately connected to printing devices conventional in the art.

For effective control of the digital output from this embodiment, it will be noted that a control logic component has been interposed between oscillator 2 and the utilization circuit made up of branch circuits 3 and 4, the control logic component 106 being connected to the storage gate associated with buffer storage 99, and being associated also with the reset terminal associated with decade counter 98. A suitable control 109 is provided to establish a sample repetition rate in the control logic.

Having thus described the invention, what is claimed as new and desired to be protected by Letters Patent is:

I claim:
1. In a device for monitoring the status of a parameter and activated by continuous or noncontinuous analog variations in such status from a predetermined norm to produce a digital or analog pulse width output correlated to such variations, the combination comprising:
 (a) an oscillator the output of which constitutes a pulsed wave having a selectively adjustable repetition rate;
 (b) a utilization circuit connected to the oscillator to receive said oscillator output and including first and second branch circuits;
 (c) first and second multivibrators serially interposed in corresponding branch circuits and arranged to be triggered simultaneously by the oscillator output to produce separate output pulses;
 (d) means associated with said multivibrators to control the width of pulses transmitted thereby in correlation to said predetermined norm and variations therefrom;
 (e) pulse width comparator means operatively interposed in said first and second branch circuits and arranged to receive and compare the widths of the separate output pulses transmitted by the multivibrators and produce a pulsed output signal the width of which constitutes the difference in width of the separate pulses compared; and
 (f) means for utilizing the pulsed output signal emanating from the pulse width comparator means.

2. The combination according to claim 1, in which said means for utilizing the pulsed output signal emanating from the pulse width comparator means comprises digital dissemination equipment.

3. The combination according to claim 1, in which means are incorporated in said first branch circuit operatively connected to said first multivibrator to correlate the width of pulses emanating therefrom with variations from said predetermined status norm.

4. The combination according to claim 1, in which means are incorporated in said second branch circuit operatively connected to said second multivibrator and selectively adjustable to control the width of pulses emanating therefrom in correlation to the value of said predetermined norm.

5. The combination according to claim 1, in which the output from said second multivibrator is applied to the pulse width comparator means associated with said first branch circuit.

6. The combination according to claim 1, in which the output from said first multivibrator is applied to the pulse width comparator means associated with said second branch circuit.

7. The combination according to claim 1, in which the output from said first multivibrator is applied to the pulse width comparator means associated with said second branch circuit and the output from said second multivibrator is applied to the pulse width comparator means associated with said first branch circuit.

8. The combination according to claim 1, in which the pulse width comparator means associated with said first and second branch circuits includes first and second inverters effective to invert the polarity of the output pulses emanating from the multivibrators.

9. The combination according to claim 1, in which said first and second multivibrators produce output pulses having a common polarity, an inverter serially interposed in one of said branch circuits effective to invert the polarity of the output pulses of the associated mutlvibrator, and circuit means interconnecting said first and second branch circuits to apply common polarity pulses from one of said branch circuits to the other of said branch circuits on the output side of said inverter whereby pulses of opposite polarity are imposed on said other branch circuit and compared to distinguish variations in width of said opposite polarity pulses.

10. The combination according to claim 1, in which said first and second multivibrators produce output pulses having a common polarity, an inverter serially interposed in each of said branch circuits and effective to invert the polarity of the output pulses of the associated multivibrator, and circuit means interconnecting said first and second branch circuits to apply common polarity pulses from each of said branch circuits to the other on the output side of the inverter in said other branch circuit whereby simultaneous pulses of opposite polarity are imposed on each of said branch circuits and compared to distinguish variations in width of said opposite polarity pulses.

11. The combination according to claim 1, in which said means for utilizing the pulses output signal emanating from the pulse width comparator means comprises a delay circuit serially connected to at least one of said branch circuits and operative to impose a controlled turn-on delay in the device.

12. The combination according to claim 1, in which said means for utilizing the pulsed output signal emanating from the pulse width comparator means includes a polarity flip-flop circuit operative to drive a load circuit including relays, bi-directional triode thyristors, silicon controlled rectifiers or transistors.

13. The combination according to claim 1, in which said pulsed output signal from the pulse width comparator means is imposed on said first branch circuit when the width of pulses emanating from said first multivibrator is greater than the width of pulses emanating from said second multivibrator.

14. The combination according to claim 1, in which said pulse output signal from the pulse width comparator means is imposed on said second branch circuit when the width of pulses emanating from said second multivibrator is greater than the width of pulses emanating from said first multivibrator.

15. The combination according to claim 1, in which said pulse width comparator means blocks the transmission of an output signal from either of said branch circuits when the pulses compared are of equal width.

16. The method of monitoring the status of a parameter to detect variations therein from a predetermined norm consisting of the steps of:
 (a) producing a succession of pulses having a steep wave front,
 (b) utilizing such pulses to simultaneously trigger two separate multivibrators,
 (c) controlling the width of pulses emanating from one of said multivibrators to a width correlated to the variation of the parameter from said predetermined norm,
 (d) controlling the width of the pulses emanating from the other multivibrator to a width corresponding to the norm selected for the parameter being monitored,
 (e) comparing the widths of said pulses emanating from said two separate multivibrators and analyzing the difference therebetween, and
 (f) extracting from the branch circuit that includes the pulse having the greater width an output pulse having a width equal to the difference in widths of the two pulses compared.

17. The method according to claim 16, in which said output pulses constituting the difference in width of the pulses compared are imposed on a delay circuit.

18. The method according to claim 16, in which said output pulse constituting the difference in width between the pulses compared is applied to a flip-flop circuit, and the output of the flip-flop circuit is applied to a load circuit.

19. The method according to claim 16, in which the output circuit constitutes a digital dissemination circuit and said output pulse is imposed directly upon said digital dissemination circuit.

20. The method according to claim 16, in which the pulse width emanating from said one multivibrator is compared with the pulse width emanating from the other multivibrator by cross-connecting the outputs from each of the multivibrators to an associated logical AND circuit, and imposing on each of said logical AND circuits associated with each of said multivibrators a pair of pulses one of said pulses emanating from the multivibrator with which the logical AND circuit is associated and being inverted in polarity and the other pulse of the pair emanating from the other multivibrator and being inverted in polarity with respect to the first-mentioned pulse of the pair.

21. The method according to claim 16, in which the outputs from the two multivibrators are compared in a single logical AND circuit, and the output from said logical AND circuit is applied directly to a digital dissemination circuit.

References Cited

UNITED STATES PATENTS

| | | | |
|---|---|---|---|
| 3,227,863 | 1/1966 | Winsor | 328—134 |
| 3,328,688 | 6/1967 | Brooks | 328—133 |

JOHN S. HEYMAN, Primary Examiner

H. A. DIXON, Assistant Examiner

U.S. Cl. X.R.

307—273